US012266488B2

(12) United States Patent
Dauksas et al.

(10) Patent No.: US 12,266,488 B2
(45) Date of Patent: Apr. 1, 2025

(54) SWITCHGEAR WITH MANUAL TRIP ASSEMBLY AND MECHANICAL INTERLOCK

(71) Applicant: G & W ELECTRIC COMPANY, Bolingbrook, IL (US)

(72) Inventors: Arturas Dauksas, Oak Lawn, IL (US); Alexander Kiefer, Naperville, IL (US); Janet Ache, Bolingbrook, IL (US); Blair S. Kerr, Downers Grove, IL (US)

(73) Assignee: G & W ELECTRIC COMPANY, Bolingbrook, IL (US)

( * ) Notice: Subject to any disclaimer, the term of this patent is extended or adjusted under 35 U.S.C. 154(b) by 198 days.

(21) Appl. No.: 17/606,372

(22) PCT Filed: Apr. 24, 2020

(86) PCT No.: PCT/US2020/029850
§ 371 (c)(1),
(2) Date: Oct. 25, 2021

(87) PCT Pub. No.: WO2020/219905
PCT Pub. Date: Oct. 29, 2020

(65) Prior Publication Data

US 2022/0238288 A1 Jul. 28, 2022

Related U.S. Application Data

(60) Provisional application No. 62/839,278, filed on Apr. 26, 2019, provisional application No. 62/902,637, filed on Sep. 19, 2019.

(51) Int. Cl.
*H01H 33/46* (2006.01)
*H01H 33/666* (2006.01)

(52) U.S. Cl.
CPC .......... *H01H 33/46* (2013.01); *H01H 33/666* (2013.01)

(58) Field of Classification Search
CPC .. H01H 33/46; H01H 33/666; H01H 33/6662; H01H 33/66207; H01H 33/027;
(Continued)

(56) References Cited

U.S. PATENT DOCUMENTS 972,048 A * 10/1910 York ........................ H01H 9/16 200/308
2,140,371 A 12/1938 Joseph et al.
(Continued)

FOREIGN PATENT DOCUMENTS

CN 2809846 Y 8/2006
CN 101290846 B 8/2011
(Continued)

OTHER PUBLICATIONS

European Office Extended European Search Report for application 20796401.6, dated Dec. 12, 2022 (8 pages).
(Continued)

*Primary Examiner* — William A Bolton
(74) *Attorney, Agent, or Firm* — Michael Best & Friedrich LLP

(57) ABSTRACT

A switchgear apparatus configured for operation at voltages up to 72.5 kV includes a vacuum interrupter assembly having a fixed contact and a movable contact configured to move relative to the fixed contact between a closed position in which the movable contact is in contact with the fixed contact and an open position in which the movable contact is spaced from the fixed contact. The switchgear apparatus also includes an electromagnetic actuator configured to move the movable contact between the open position and the closed position, a manual trip assembly movable from an
(Continued)

initial position to an actuated position to move the movable contact from the closed position to the open position, and a mechanical interlock assembly configured to prevent the movable contact from moving from the open position to the closed position when the manual trip assembly is in the actuated position.

19 Claims, 9 Drawing Sheets

(58) Field of Classification Search
CPC ......... H01H 2033/6665; H01H 71/128; H01H 9/16; H01H 2009/0292
USPC ................ 218/140, 120, 141, 142, 153–155; 200/50.01, 446, 448
See application file for complete search history.

(56) References Cited

U.S. PATENT DOCUMENTS 2,875,381 A 2/1959 Chabala
3,320,377 A 5/1967 Yonkers
3,956,721 A * 5/1976 Link .................... H01H 33/666 218/139
4,124,790 A 11/1978 Kumbera et al.
4,283,610 A 8/1981 Date et al.
4,527,028 A 7/1985 Luehring
4,568,804 A 2/1986 Luehring
4,880,947 A 11/1989 Fey et al.
4,950,854 A 8/1990 Green
5,004,877 A 4/1991 Yin
5,091,616 A 2/1992 Ramos et al.
5,175,403 A 12/1992 Hamm et al.
5,321,221 A 6/1994 Rozier
5,597,992 A 1/1997 Walker
5,753,876 A 5/1998 Lanning
5,808,258 A 9/1998 Luzzi
5,834,725 A * 11/1998 Clarke ................. H01H 33/128 218/120
5,912,604 A 6/1999 Harvey et al.
6,130,394 A 10/2000 Hoegl
6,198,062 B1 3/2001 Mather et al.
6,268,579 B1 7/2001 Kajiwara et al.
6,888,086 B2 5/2005 Daharsh et al.
6,989,498 B1 1/2006 Linder et al.
7,053,327 B2 5/2006 Benk et al.
7,215,228 B2 5/2007 Rhein
7,488,916 B2 2/2009 Muench et al.
7,563,161 B2 7/2009 Perret et al.
7,772,515 B2 8/2010 Stoving et al.
8,035,054 B2 10/2011 Ozawa et al.
8,178,812 B2 5/2012 Martin et al.
8,269,130 B2 9/2012 Mangan et al.
8,272,127 B2 9/2012 Kowalyshen et al.
8,378,242 B2 2/2013 Kim
8,674,254 B2 3/2014 Borgstrom
8,729,416 B2 * 5/2014 Bullock ............. H01H 33/6662 218/118
8,772,666 B2 7/2014 Darko et al.
8,785,802 B2 7/2014 Shang
8,796,570 B2 8/2014 Kobayashi et al.
8,933,358 B2 1/2015 Yang
9,070,517 B2 6/2015 Bullock et al.
9,177,742 B2 11/2015 Ache et al.
9,190,231 B2 11/2015 Borgstrom et al.
9,208,962 B2 12/2015 Bose et al.
9,275,807 B2 3/2016 Darko et al.
9,543,081 B2 1/2017 Ozil et al.
9,633,802 B2 4/2017 Chapelle et al.
9,633,807 B2 4/2017 Ache et al.
9,640,350 B2 5/2017 Stoving et al.
9,659,728 B2 5/2017 Martin et al.
9,685,280 B2 6/2017 Benson et al.
9,685,283 B2 6/2017 Darko et al.
9,953,772 B2 * 4/2018 Korves .................... H01H 9/16
10,074,496 B2 9/2018 Lamara et al.
10,115,547 B2 10/2018 Gerovac et al.
2001/0025829 A1 10/2001 Marin-pache et al.
2005/0082260 A1 4/2005 Martin et al.
2006/0231529 A1 10/2006 Daharsh et al.
2008/0087647 A1 5/2008 Volkmar
2010/0000972 A1 1/2010 Bodenstein et al.
2010/0089874 A1 4/2010 Morita et al.
2010/0276395 A1 11/2010 Gardner
2012/0261384 A1 10/2012 Labianco et al.
2013/0187732 A1 7/2013 Bullock et al.
2014/0138357 A1 5/2014 Kasza et al.
2015/0221464 A1 8/2015 Gentsch et al.
2015/0262768 A1 * 9/2015 Siebens .................... H01H 9/16 200/50.32
2015/0311009 A1 * 10/2015 Ding .................... H01H 3/3015 218/140
2015/0332883 A1 * 11/2015 Benke ...................... H01H 3/32 335/10
2016/0005560 A1 1/2016 Ache et al.
2016/0012994 A1 * 1/2016 Boffelli .................. H01H 50/32 335/168
2016/0126037 A1 5/2016 Gerovac et al.
2016/0141117 A1 5/2016 Ashteka et al.
2017/0207039 A1 7/2017 Pohle
2019/0259554 A1 8/2019 Hillmann

FOREIGN PATENT DOCUMENTS

CN 206135272 U 4/2017
CN 109449042 A 3/2019
EP 1120804 A1 8/2001
EP 1482528 A2 12/2004
EP 1811536 A1 7/2007
EP 2859567 B1 8/2018
GB 391771 A 4/1933
JP 3969344 B2 9/2007
WO WO1990001788 A1 2/1990
WO WO2000041199 A1 7/2000
WO WO2002069352 A1 9/2002
WO WO2009098122 A1 8/2009
WO WO2010058025 A1 5/2010
WO WO2011075931 A1 6/2011
WO 2013187886 A2 12/2013
WO WO2019133611 A1 7/2019

OTHER PUBLICATIONS

International Preliminary Report on Patentability for Application No. PCT/US2020/029841 dated Nov. 21, 2021 (10 pages).
International Search Report and Written Opinion for Application No. PCT/US2020/029841 dated Aug. 14, 2020 (13 pages).
International Preliminary Report on Patentability for Application No. PCT/US2020/029850 dated Nov. 4, 2021 (7 pages).
International Search Report and Written Opinion for Application No. PCT/US2020/029850 dated Aug. 14, 2020 (10 pages).
International Preliminary Report on Patentability for Application No. PCT/US2020/029865 dated Nov. 4, 2021 (7 pages).
International Search Report and Written Opinion for Application No. PCT/US2020/029865 dated Aug. 14, 2020 (11 pages).
International Preliminary Report on Patentability for Application No. PCT/US2020/029868 dated Nov. 4, 2021 (7 pages).
International Search Report and Written Opinion for Application No. PCT/US2020/029868 dated Aug. 14, 2020 (10 pages).
G&W Electric, "Viper-ST," Catalog O-vst14, dated Nov. 2014 (12 pages).
G&W Electric, "Viper-SP," Catalog VSP10, dated Jun. 2010 (8 pages).

* cited by examiner

SWITCHGEAR WITH MANUAL TRIP ASSEMBLY AND MECHANICAL INTERLOCK

CROSS-REFERENCE TO RELATED APPLICATIONS

This application is a national phase entry pursuant to 35 U.S.C § 371 of International Patent Application No. PCT/US2020/029850, filed on Apr. 24, 2020, which claims priority to U.S. Provisional Patent Application No. 62/839,278, filed on Apr. 26, 2019, and to U.S. Provisional Patent Application No. 62/902,637, filed on Sep. 19, 2019, the entire contents of both all of which are incorporated herein by reference.

FIELD OF THE DISCLOSURE

The present disclosure relates to solid dielectric switchgear, and more particularly to reclosers.

BACKGROUND OF THE DISCLOSURE

Reclosers are switchgear that provide line protection, for example, on overhead electrical power lines and/or substations and serve to segment the circuits into smaller sections, reducing the number of potentially impacted customers in the event of a short circuit. Previously, reclosers were controlled using hydraulics. More recently, solid dielectric reclosers have been developed for use at voltages up to 38 kV. Solid dielectric reclosers may be paired with electronic control devices to provide automation and "smart" recloser functionality.

SUMMARY OF THE DISCLOSURE

A need exists for fault protection and circuit segmentation in power transmission circuits, which typically operate at higher voltages (e.g., up to 1,100 kV). Reclosers allow for multiple automated attempts to clear temporary faults on overhead lines. A need also exists, however, for a recloser with a manual trip assembly that allows the recloser to be manually operated for servicing or in the event of a failure of the recloser or its controls.

The present disclosure provides, in one aspect, a switchgear apparatus configured for operation at voltages up to 72.5 kV, including a vacuum interrupter assembly having a fixed contact and a movable contact configured to move relative to the fixed contact between a closed position in which the movable contact is in contact with the fixed contact and an open position in which the movable contact is spaced from the fixed contact. The switchgear apparatus also includes an electromagnetic actuator configured to move the movable contact between the open position and the closed position, a manual trip assembly movable from an initial position to an actuated position to move the movable contact from the closed position to the open position, and a mechanical interlock assembly configured to prevent the movable contact from moving from the open position to the closed position when the manual trip assembly is in the actuated position.

The present disclosure provides, in another aspect, a switchgear apparatus configured for operation at voltages up to 72.5 kV, including a vacuum interrupter assembly having a fixed contact and a movable contact configured to move relative to the fixed contact between a closed position in which the movable contact is in contact with the fixed contact and an open position in which the movable contact is spaced from the fixed contact. The switchgear apparatus also includes an electromagnetic actuator configured to move the movable contact between the open position and the closed position, and a manual trip assembly movable from an initial position to an actuated position to move the movable contact from the closed position to the open position. The manual trip assembly includes a first lever and a second lever coupled to the first lever such that the first and second lever provide a compound mechanical advantage.

Other aspects of the invention will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. In addition, as used herein and in the appended claims, the terms "upper", "lower", "top", "bottom", "front", "back", and other directional terms are not intended to require any particular orientation, but are instead used for purposes of description only.

Figure 1:
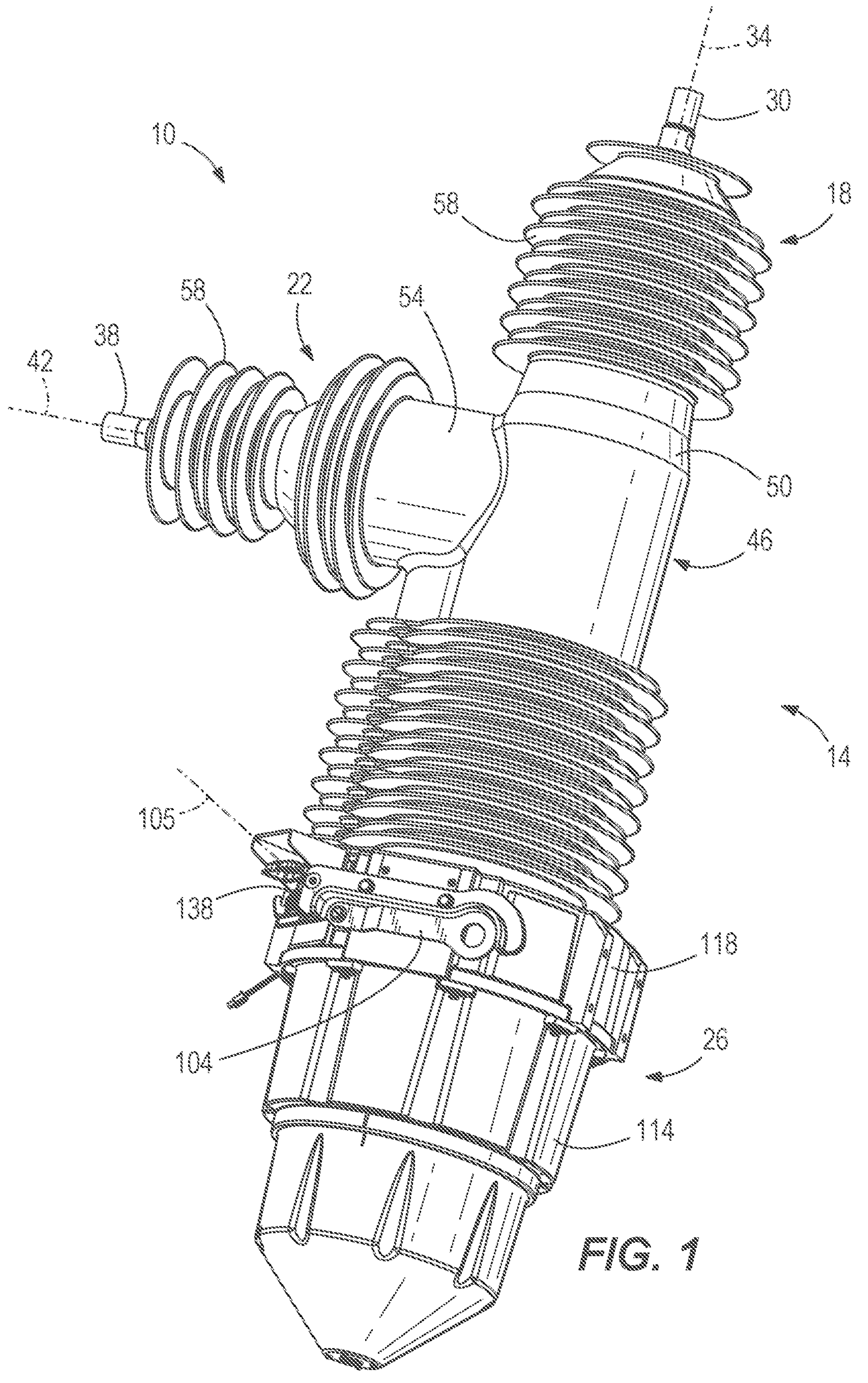
FIG. 1 is a perspective view of a recloser and/or switchgear apparatus ("recloser") according to an embodiment of the present disclosure.

FIG. 1 illustrates a recloser 10 according to an embodiment of the present disclosure. The recloser 10 includes a housing assembly 14, a vacuum interrupter ("VI") assembly 18, a conductor assembly 22, which in some embodiments may be a load-side conductor assembly 22 and in other embodiments may be a source-side conductor assembly 22, and an actuator assembly 26. The VI assembly 18 includes a first terminal 30 extending from the housing assembly 14 along a first longitudinal axis 34, and the conductor assembly 22 includes a second terminal 38 extending from the housing assembly 14 along a second longitudinal axis 42 perpendicular to the first longitudinal axis 34. In other embodiments, the second longitudinal axis 42 may be obliquely oriented relative to the first longitudinal axis 34. The actuator assembly 26 may operate the VI assembly 18 to selectively break and/or reestablish a conductive pathway between the first and second terminals 30, 38. Although the recloser 10 is illustrated individually in FIG. 1, the recloser 10 may be part of a recloser system including a plurality of reclosers 10, each associated with a different phase of a three-phase power transmission system and ganged together such that operation of the plurality of reclosers 10 is synchronized.

Figure 2:
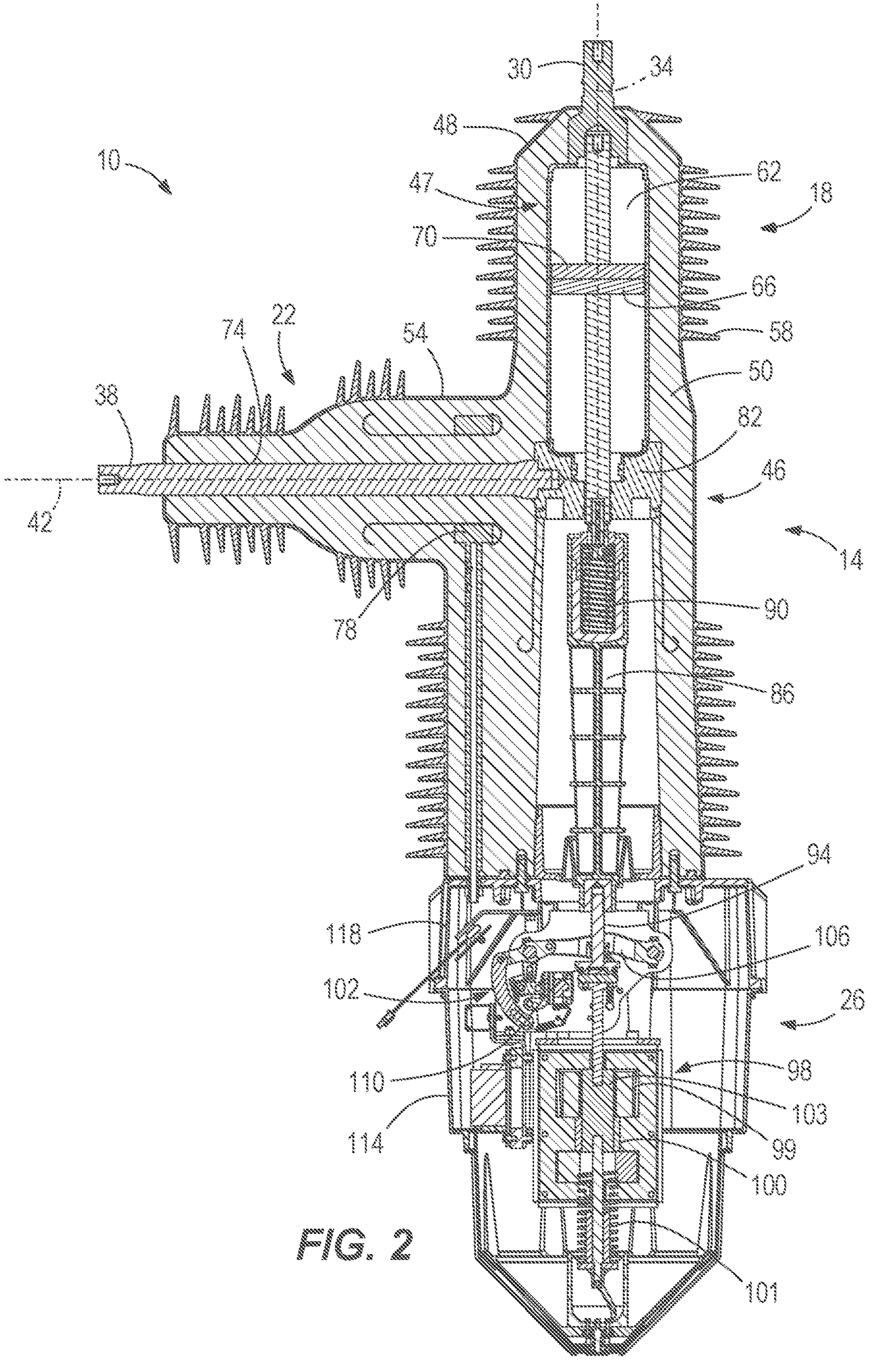
FIG. 2 is a cross-sectional view of the recloser of FIG. 1.

Referring now to FIG. 2, the illustrated housing assembly 14 includes a main housing 46 with an insulating material, such as epoxy, that forms a solid dielectric module 47. The solid dielectric module 47 is preferably made of a silicone or cycloaliphatic epoxy. In other embodiments, the solid dielectric module 47 may be made of a fiberglass molding compound. In other embodiments, the solid dielectric module 47 may be made of other moldable dielectric materials. The main housing 46 may further include a protective layer 48 surrounding the solid dielectric module 47. In some embodiments, the protective layer 48 withstands heavily polluted environments and serves as an additional dielectric material for the recloser 10. In some embodiments, the protective layer 48 is made of silicone rubber that is overmolded onto the solid dielectric module 47. In other embodiments, the protective layer 48 may be made of other moldable (and preferably resilient) dielectric materials, such as polyurethane.

With continued reference to FIG. 2, the main housing 46 includes a first bushing 50 that surrounds and at least partially encapsulates the VI assembly 18, and a second bushing 54 that surrounds and at least partially encapsulates the conductor assembly 22. The silicone rubber layer 48 includes a plurality of sheds 58 extending radially outward from both bushings 50, 54. In other embodiments, the sheds 58 may be formed as part of the dielectric module 47 and covered by the silicone rubber layer 48. In yet other embodiments, the sheds 58 may be omitted. The first and second bushings 50, 54 may be integrally formed together with the dielectric module 47 of the main housing 46 as a single monolithic structure. Alternatively, the first and second bushings 50, 54 may be formed separately and coupled to the main housing 46 in a variety of ways (e.g., via a threaded connection, snap-fit, etc.).

The illustrated VI assembly 18 includes a vacuum bottle 62 at least partially molded within the first bushing 50 of the main housing 46. The vacuum bottle 62 encloses a movable contact 66 and a stationary contact 70 such that the movable contact 66 and the stationary contact 70 are hermetically sealed within the vacuum bottle 62. In some embodiments, the vacuum bottle 62 has an internal absolute pressure of about 1 millipascal or less. The movable contact 66 is movable along the first longitudinal axis 34 between a closed position (illustrated in FIG. 2) and an open position (not shown) to selectively establish or break contact with the stationary contact 70. The vacuum bottle 62 quickly suppresses electrical arcing that may occur when the contacts 66, 70 are opened due to the lack of conductive atmosphere within the bottle 62.

The conductor assembly 22 may include a conductor 74 and a sensor assembly 78, each at least partially molded within the second bushing 54 of the main housing 46. The sensor assembly 78 may include a current sensor, voltage sensor, partial discharge sensor, voltage indicated sensor, and/or other sensing devices. One end of the conductor 74 is electrically coupled to the movable contact 66 via a current interchange 82. The opposite end of the conductor 74 is electrically coupled to the second terminal 38. The first terminal 30 is electrically coupled to the stationary contact 70. The first terminal 30 and the second terminal 38 are configured for connection to respective electrical power transmission lines.

With continued reference to FIG. 2, the actuator assembly 26 includes a drive shaft 86 extending through the main housing 46 and coupled at one end to the movable contact 66 of the VI assembly 18. In the illustrated embodiment, the drive shaft 86 is coupled to the movable contact 66 via an encapsulated spring 90 to permit limited relative movement between the drive shaft 86 and the movable contact 66. The encapsulated spring 90 biases the movable contact 66 toward the stationary contact 70. The opposite end of the drive shaft 86 is coupled to an output shaft 94 of an electromagnetic actuator 98. The electromagnetic actuator 98 is operable to move the drive shaft 86 along the first longitudinal axis 34 and thereby move the movable contact 66 relative to the stationary contact 70. In additional or alternative embodiments, the functionality provided by the encapsulated spring 90 may be provided with an external spring and/or a spring positioned otherwise along the drive shaft 86. For example, the spring may be instead positioned at a first end or at a second end of the drive shaft 86.

The electromagnetic actuator 98 in the illustrated embodiment includes a coil 99, a permanent magnet 100, a spring 101, and a plunger 103 that is coupled to the output shaft 94. The coil 99 includes one or more copper windings which, when energized, produce a magnetic field that acts on the plunger 103 to move the output shaft 94. The permanent magnet 100 is configured to hold the plunger 103 and the output shaft 94 in a position corresponding with the closed position of the movable contact 66. In some embodiments, the permanent magnet 100 may produce a magnetic holding force on the output shaft 94 of about 10,000 Newtons (N). In other embodiments, the permanent magnet 100 may produce a magnetic holding force on the output shaft 94 between 7,000 N and 13,000 N.

The spring 101 biases the output shaft 94 in an opening direction (i.e. downward in the orientation of FIG. 2) to facilitate opening the contacts 66, 70, as described in greater detail below. The force exerted by the spring 101 when the contacts 66, 70 are in the closed position is less than the magnetic holding force. For example, in some embodiments, the force exerted by the spring 101 when the contacts 66, 70 are in the closed position may be about 5,000 N. In other embodiments, the force may be between 2,000 N and 6,000 N. Thus, the permanent magnet 100 provides a strong magnetic holding force to maintain the contacts 66, 70 in their closed position against the biasing force of the spring 101, without requiring any current to be supplied through the coil 99.

In some embodiments, the actuator assembly 26 may include other actuator configurations. For example, in some embodiments, the permanent magnet 100 may be omitted, and the output shaft 94 may be latched in the closed position in other ways. In additional or alternative embodiments, the electromagnetic actuator 98 may be omitted or replaced by any other suitable actuator (e.g., a hydraulic actuator, etc.).

The actuator assembly 26 includes a controller (not shown) that controls operation of the electromagnetic actuator 98. In some embodiments, the controller receives feedback from the sensor assembly 78 and energizes and/or de-energizes the electromagnetic actuator 98 automatically in response to one or more sensed conditions. For example, the controller may receive feedback from the sensor assembly 78 indicating that a fault has occurred. In response, the controller may control the electromagnetic actuator 98 to automatically open the VI assembly 18 and break the circuit. The controller may also control the electromagnetic actuator 98 to automatically close the VI assembly 18 once the fault has been cleared (e.g., as indicated by the sensor assembly 78).

Figure 3:
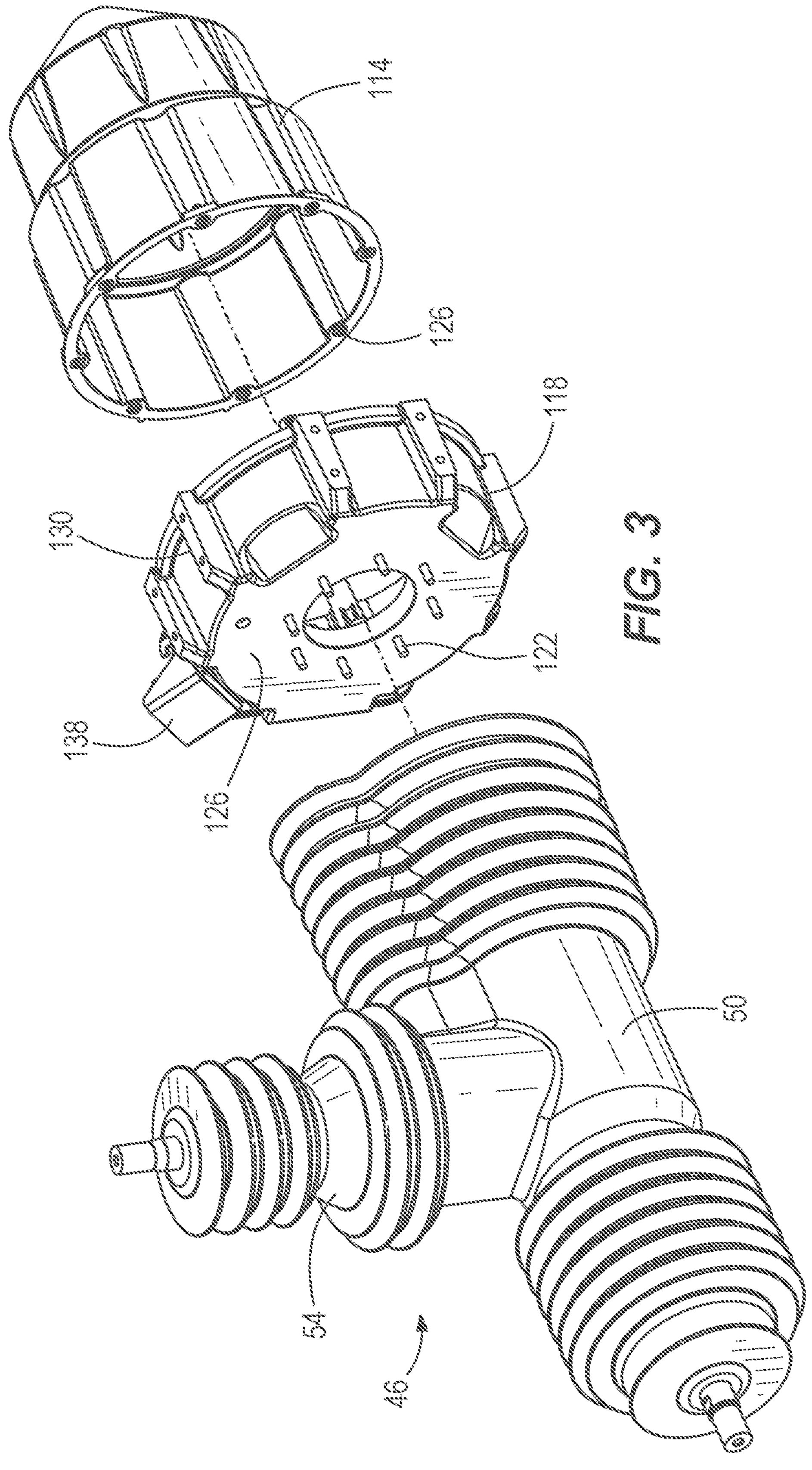
FIG. 3 is an exploded perspective view of a housing of the recloser of FIG. 1.

The illustrated housing assembly 14 includes an actuator housing 114 enclosing the electromagnetic actuator 98 and a head casting 118 coupled between the actuator housing 114 and the main housing 46. In the illustrated embodiment, the head casting 118 supports a connector 138 in communication with the sensor assembly 78 such that feedback from the sensor assembly 78 may be obtained by interfacing with the connector 138 (FIG. 3). The head casting 118 is coupled to the main housing 46 by a first plurality of threaded fasteners 122, and the actuator housing 114 is coupled to the head casting 118 opposite the main housing 46 by a second plurality of threaded fasteners 126.

Figure 5:
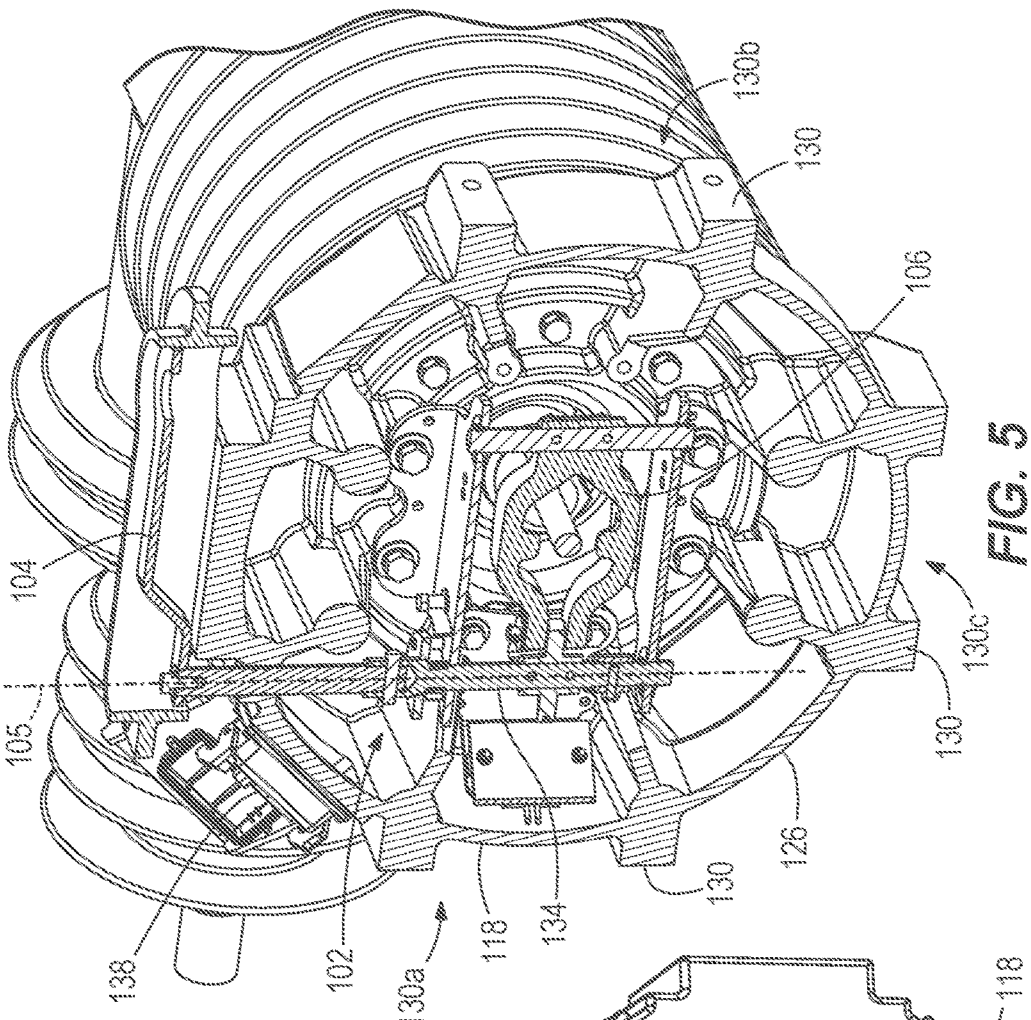
FIG. 5 is a cross-sectional view of the recloser of FIG. 1, taken through the head casting of FIG. 4.
Figure 4:
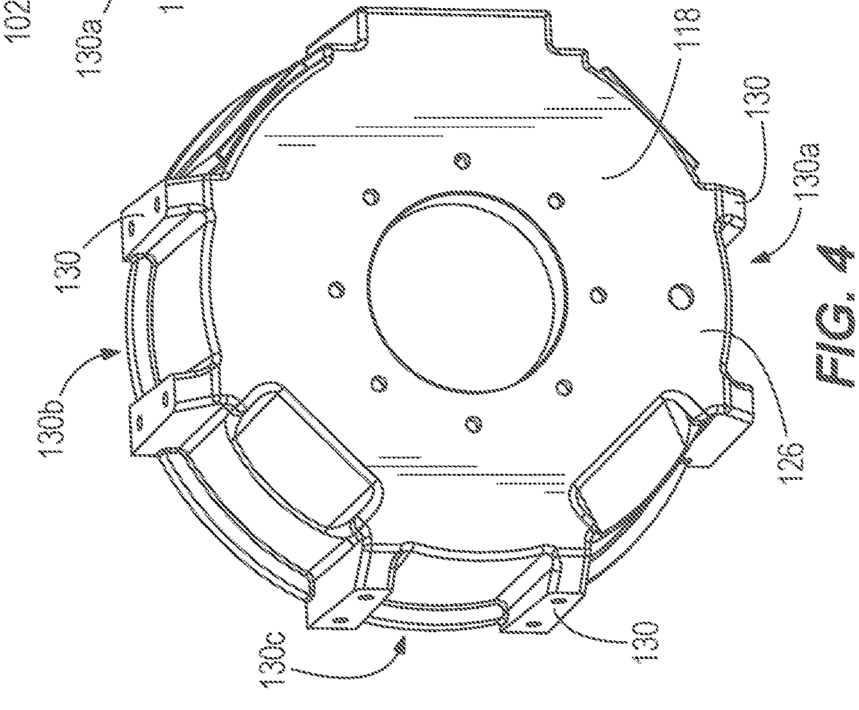
FIG. 4 is a perspective view of a head casting of the recloser of FIG. 1.

Referring to FIGS. 4 and 5, the head casting 118 includes a main body 126 and a plurality of mounting bosses 130 spaced along the outer periphery of the main body 126. In the illustrated embodiment, the plurality of mounting bosses 130 includes a first pair of bosses **130*a* extending from the main body 126 in a first direction, a second pair of bosses 130*b* extending from the main body 126 in a second direction opposite the first direction, and a third pair of bosses 130*c* extending from the main body 126 in a third direction orthogonal to the first and second directions. In other embodiments, the head casting 118 may include a different number and/or arrangement of mounting bosses 130**.

The head casting 118 is couplable to the main housing 46 in a plurality of different orientations such that the pairs of bosses 130 (**130*a*, 130*b*, 130*c*) may be positioned in a number of different rotational orientations about axis 34 with respect to the main housing 46. That is, the rotational orientation of the pairs of bosses 130 about the circumference of the main housing 46 may be varied as desired by rotating the orientation of the head casting 118 and main housing 46 relative to one another about the axis 34 to a desired position before coupling the head casting 118 and the main housing 46. In some embodiments, the head casting 118 may be coupled to the main housing 46 in at least three different orientations. In other embodiments, the head casting 118 may be coupled to the main housing 46 in at least six different orientations. In other embodiments, the main housing 46, the head casting 118, and the actuator housing 114** may be coupled together in other ways (e.g., via direct threaded connections or the like).

With reference to FIG. 5, the illustrated actuator assembly 26 includes a manual trip assembly 102 supported by the head casting 118 and that can be used to manually open the VI assembly 18. The manual trip assembly 102 includes a handle 104 accessible from an exterior of the housing assembly 14. In the illustrated embodiment, the handle 104 of the manual trip assembly 102 extends along a side of the main body 126 opposite the third pair of bosses **130*c* and generally adjacent the connector 138. The handle 104 is preferably at a grounded potential. Because the head casting 118 is couplable to the main housing 46 in different orientations, the position of the handle 104 with respect to the main housing 46 is also variable. As such, the handle 104 may be accessible to an operator when the recloser 10 is in a wide variety of different mounting configurations. As described in greater detail below, the handle 104 is rotatable about a first rotational axis 105 to move a yoke 106 inside the head casting 118. The yoke 106 is engageable with a collar 110 on the output shaft 94 to move the movable contact 66 (FIG. 2**) toward the open position.

Figure 6:
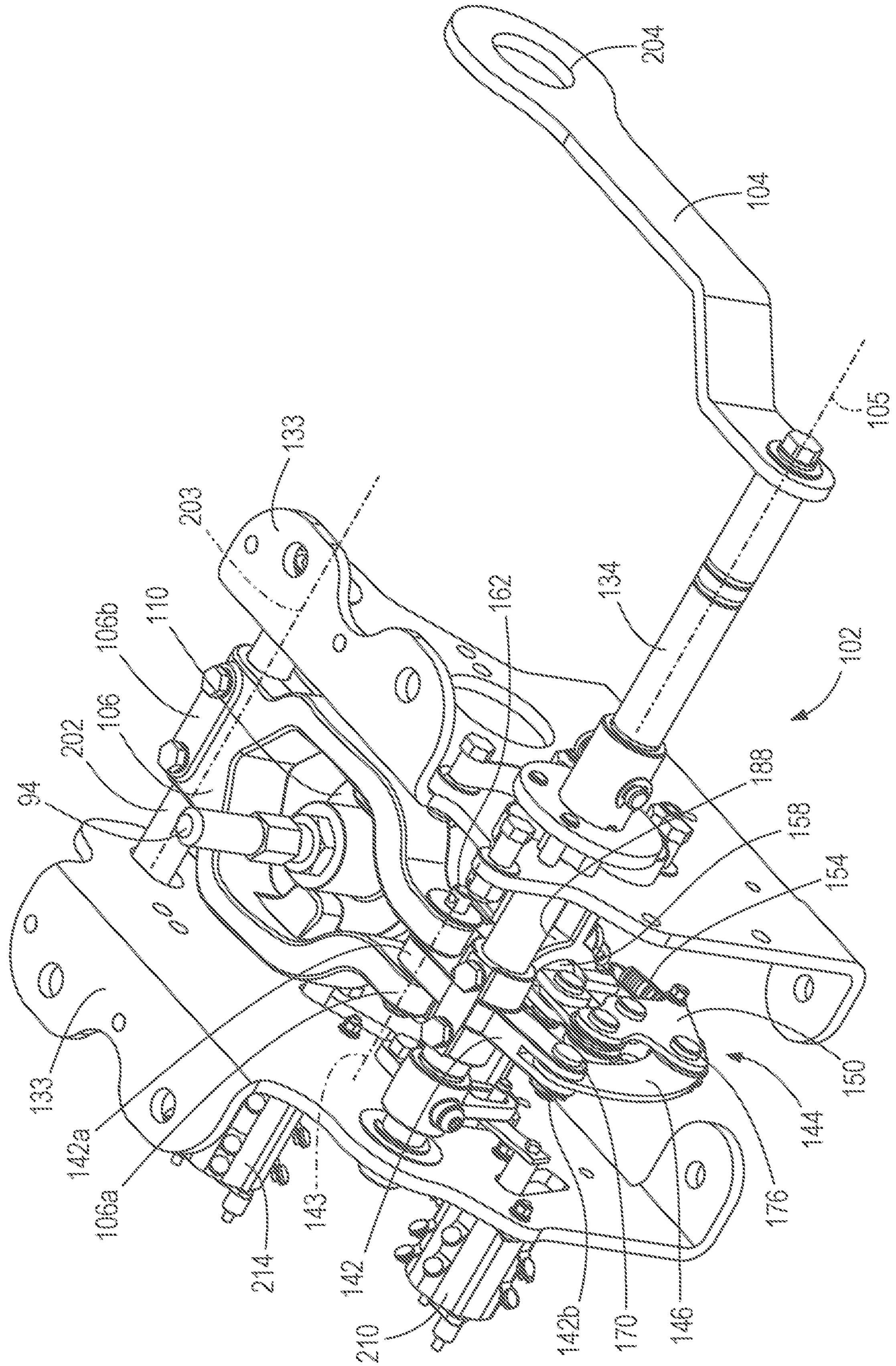
FIG. 6 is a perspective view illustrating a manual trip assembly of the recloser of FIG.

Referring to FIGS. 5-6, the illustrated manual trip assembly 102 includes a pair of support brackets 133 fixed inside the head casting 118 and a shaft 134 extending through the main body 126 of the head casting 118 along the first rotational axis 105. The shaft 134 is rotatably supported by the support brackets 133 and is coupled to the handle 104 for co-rotation therewith about the rotational axis 105. The shaft 134 may include a plurality of segments coupled together by one or more fasteners, or the shaft 134 may be formed as a unitary structure. The manual trip assembly 102 also includes a link 142 coupled for co-rotation with the shaft 134 (e.g., by a plurality of fasteners). The link 142 includes a first end **142*a* pivotally coupled to a first end 106*a* of the yoke 106 by a first pin 162 for relative pivotal movement about a second rotational axis 143 parallel to the first rotational axis 105. A second end 142*b* of the link 142 opposite the first end 142*a* provides an input to a mechanical interlock assembly 144**.

The mechanical interlock assembly 144 includes a lost motion member 146, an actuating member 150, a spring 154, and a blocking plunger 158. As described in greater detail below, the blocking plunger 158 of the mechanical interlock assembly 144 is movable from a retracted position (FIGS. 7-8) to an extended position (FIG. 9) in which the blocking plunger 158 is engageable with the output shaft 94 to lock the movable contact 66 in its open position, thereby preventing the electromagnetic actuator 98 from reclosing the contacts 66, 70. The lost motion member 146 delays movement of the blocking plunger 158 from the retracted position to the extended position until the contacts 66, 70 have been opened and the collar 110 of the output shaft 94 has moved below the blocking plunger 158.

Figure 7:
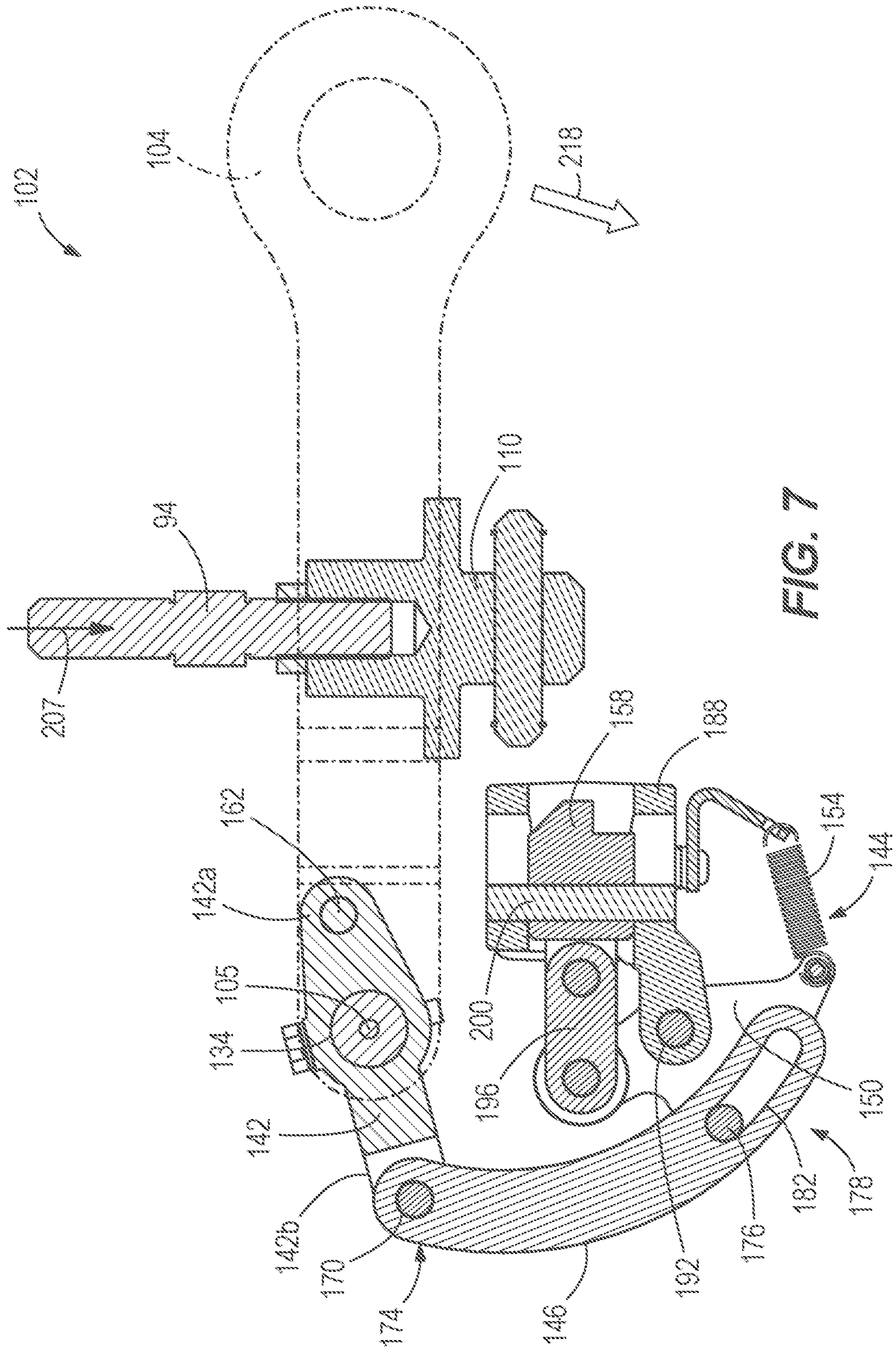
FIG. 7 is a cross-sectional view illustrating a portion of the manual trip assembly of FIG. 6 in an initial position.

Referring to FIG. 7, the lost motion member 146 has an arcuate shape, and a second pin 170 pivotally couples a first end 174 of the lost motion member 146 to the second end **142*b* of the link 142. A third pin 176 couples a second end 178 of the lost motion member 146 to the actuating member 150. The third pin 176 is slidably received within an arcuate slot 182 in the lost motion member 146. The arcuate slot 182 defines a lost motion region that allows for limited movement of the lost motion member 146 relative to the actuating member 150**.

Referring to FIGS. 6-9 the blocking plunger 158 is received within a plunger housing 188 that is fixed to the support brackets 133. The actuating member 150 is pivotally coupled to the plunger housing 188 by a fourth pin 192. The actuating member 150 is also coupled to the blocking plunger 158 by an intermediate link 196. As such, pivotal movement of the actuating member 150 about the fourth pin 192 imparts movement to the blocking plunger 158. In the illustrated embodiment, a guide pin 200 extends through the blocking plunger 158 and interfaces with the plunger housing 188. The guide pin 200 and the plunger housing 188 constrain movement of the blocking plunger 158 to generally linear movement along the plunger housing 188.

Referring again to FIG. 6, a second end **106*b* of the yoke 106 is pivotally coupled to a fifth pin 202 extending between and fixed to the support brackets 133. As such, the yoke 106 is pivotable about a third rotational axis 203 extending centrally through the fifth pin 202. The third rotational axis 203 is parallel to both the first rotational axis 105 and the second rotational axis 143**.

Figure 10:
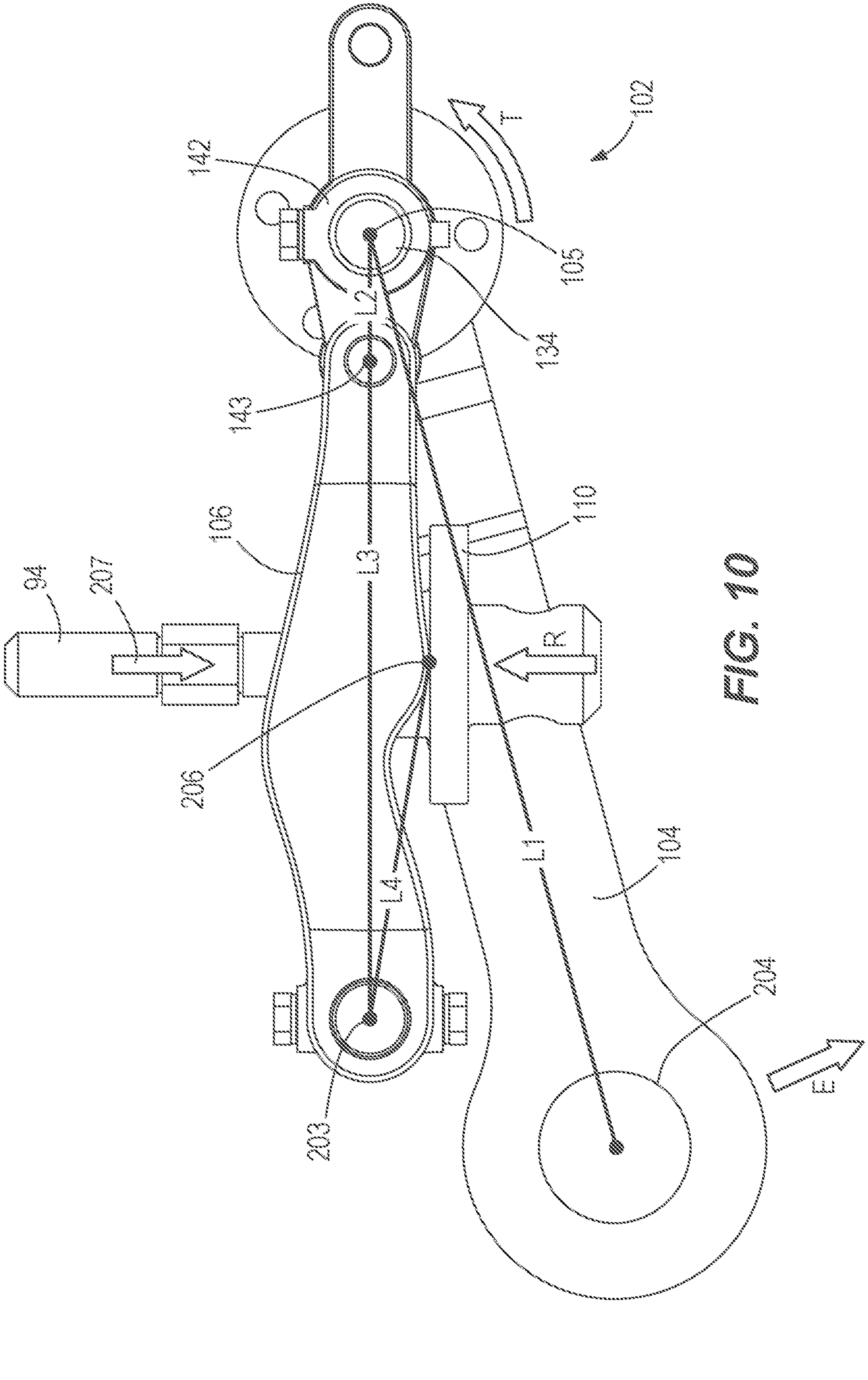
FIG. 10 is a side view illustrating actuation of the manual trip assembly.

With reference to FIG. 10, the yoke 106 includes a projection 206 that is engageable with the collar 110 on the output shaft 94 to move the output shaft 94 downward (in the direction of arrow 207 in FIG. 10) and thereby open the contacts 66, 70 in response to actuation of the manual trip assembly 102. The handle 104, the link 142, and the yoke 106 provide a compound lever arrangement to allow the manual trip assembly 102 to overcome the strong magnetic holding force of the permanent magnet 100 when the contacts 66, 70 are closed.

In the illustrated embodiment, the handle 104 defines a first distance L1 from the center of an aperture 204 in the handle 104 to the first rotational axis 105 (the aperture 204 may be configured to receive a hook to facilitate operating the manual trip assembly 102 when the recloser 10 is mounted on a pole, for example). The link 142 defines a second distance L2 from the first rotational axis 105 to the second rotational axis 143. The yoke 106 defines a third distance L3 from the second rotational axis 143 to the third rotational axis 203. Finally, the yoke 106 also defines a fourth distance L4 from the third rotational axis 203 to the point of engagement between the projection 206 and the collar 110.

The handle 104 and link 142 define a first, second-class lever, and the yoke 106 and link 142 define a second, second-class lever. The two levers combine their respective mechanical advantages to apply a large axial force to the collar 110 while minimizing the length L1 of the handle 104. It is advantageous to minimize the length L1 of the handle 104 in order to provide the recloser 10 with a compact overall size (i.e. to avoid the handle 104 from protruding significantly beyond the housing assembly 14).

For example, in some embodiments, the manual trip assembly 102 may apply sufficient force to the collar 110 to overcome a resistance force R of about 5,000 N (e.g., due to the permanent magnet 100) and thereby open the contacts 66, 70 by applying a torque T of about 90 ft-lbs or less via the handle 104. The required torque T is provided by applying a force E on the handle 104 at the aperture 204. The force E can be calculated according to the following equation:

$$E=R*L2/L1*L4/L3 \qquad \text{Equation(1)}$$

Because L2 is much smaller than L1 in the illustrated embodiment, and L4 is smaller than L3, it is evident from Equation (1) that the force E (i.e. the effort force required from the operator) is significantly less than the resistance force R.

In other embodiments, the manual trip assembly 102 may include other mechanisms for amplifying the force applied on the handle 104 in order to overcome the resistance force R. For example, the manual trip assembly 102 may include one or more hydraulic or pneumatic actuators, pulleys, linkages, or other suitable mechanisms coupled between the handle 104 and the collar 110.

With reference to FIG. 6, in the illustrated embodiment, the recloser 10 includes first and second state sensors 210, 214 configured to detect the state of the manual trip assembly 102 (i.e. whether the handle 104 is actuated or unactuated) and the state of the VI assembly 18 (i.e. whether the contacts 66, 70 are open or closed). The state sensors 210, 214 may communicate this information to the controller of the recloser 10. In the illustrated embodiment, the state sensors 210, 214 are configured as electrical contacts (e.g., microswitches) responsive to movement of the shaft 134 and the output shaft 94, respectively. In other embodiments, any other types of sensors (e.g., Hall-effect sensors or the like) for determining the state of the manual trip assembly 102 and the VI assembly 18 may be used.

Exemplary operating sequences of the recloser 10 according to certain embodiments of the present disclosure will now be described.

With reference to FIG. 2, during operation, the controller of the recloser 10 may receive feedback from the sensor assembly 78 indicating that a fault has occurred. In response to this feedback, the controller may initiate a circuit breaking sequence. In the circuit breaking sequence, the controller automatically energizes the coil 99 of the electromagnetic actuator 98. The resultant magnetic field generated by the coil 99 moves the plunger 103 and the output shaft 94 in an opening direction (i.e. downward in the orientation of FIG. 2). This movement greatly reduces the magnetic holding force of the permanent magnet 100 on the plunger 103. For example, in some embodiments, the plunger 103 may have a resilient construction and retract inwardly and away from the permanent magnet 100 as the plunger 103 moves in the opening direction, thereby creating an air gap between the plunger 103 and the magnet 100. In other embodiments, the width of the plunger 103 may decrease in the opening direction to create an air gap between the plunger 103 and the magnet 100. In yet other embodiments, the plunger 103 may include one or more non-magnetic regions and/or a reduced volume of magnetic material that may move into proximity with the permanent magnet 100 as the plunger 103 moves in the opening direction.

With the holding force of the permanent magnet 100 reduced, the spring 101 is able to overcome the holding force of the permanent magnet 100 and accelerate the output shaft 94 in the opening direction. As such, the coil 99 need only be energized momentarily to initiate movement of the output shaft 94, advantageously reducing the power drawn by the electromagnetic actuator 98 and minimizing heating of the coil 99.

The output shaft 94 moves the drive shaft 86 with it in the opening direction. As the drive shaft 86 moves in the opening direction, the encapsulated spring 90, which is compressed when the contacts 66, 70 are closed, begins to expand. The spring 90 thus initially permits the drive shaft 86 to move in the opening direction relative to the movable contact 66 and maintains the movable contact 66 in fixed electrical contact with the stationary contact 70. As the drive shaft 86 continues to move and accelerate in the opening direction under the influence of the spring 101, the spring 90 reaches a fully expanded state. When the spring 90 reaches its fully expanded state, the downward movement of the drive shaft 86 is abruptly transferred to the movable contact 66. This quickly separates the movable contact 66 from the stationary contact 70 and reduces arcing that may occur upon separating the contacts 66, 70. By quickly separating the contacts 66, 70, degradation of contacts 66, 70 due to arcing is reduced, and the reliability of the VI assembly 18 is improved.

The controller may then receive feedback from the sensor assembly 78 indicating that the fault has been cleared and initiate a reclosing sequence. In additional and/or alternative embodiments, the controller may initiate the reclosing sequence after waiting a predetermined time period after the fault was originally detected, or in response to receiving a signal from an external controller commanding the controller to initiate the reclosing sequence. In the reclosing sequence, the controller energizes the coil 99 in an opposite current direction. The resultant magnetic field generated by the coil 99 moves the output shaft 94 (and with it, the drive shaft 86 and the movable contact 66) in a closing direction (i.e. upward in the orientation of FIG. 2).

The movable contact 66 comes into contact with the fixed contact 70, restoring a conductive path between the terminals 34, 38. The output shaft 94 and drive shaft 86 continue to move in the closing direction, compressing each of the springs 90, 101 to preload the springs 90, 101 for a subsequent circuit breaking sequence. As the output shaft 94 approaches the end of its travel, the plunger 103 of electromagnetic actuator 98 is influenced by the permanent magnet 100, which latches the plunger 103 in its starting position. The coil 99 may then be de-energized. In some embodiments, the coil 99 may be de-energized a predetermined time period after the contacts 66, 70 are closed. This delay may inhibit the movable contact 66 from rebounding back to the open position.

In some circumstances, an operator may opt to manually initiate a circuit breaking operation to open the contacts 66, 70 using the manual trip assembly 102. To do so, the operator may apply a force E (FIG. 10) to the handle 104, which is conveniently accessible from the exterior of the housing assembly 14 (FIG. 1). In some embodiments, the handle 104 may be a contrasting color from the housing assembly 14. For example, the handle 104 may be a high-visibility color, such as yellow, to allow the handle 104 to be easily visible to the operator.

As the operator applies the force E, the handle 104, the shaft 134, and the link 142 pivot from an initial or unactuated state, illustrated in FIG. 7, about the first rotational axis 105 generally in the direction of arrow 218. This causes the yoke 106 to pivot downward about the third rotational axis 203, such that the projection 206 bears against the collar 110 on the output shaft 94 (FIG. 10). As discussed above, the compound lever action of the handle 104, link 142, and yoke 106 amplifies the force E. The first end 106*a* of the yoke 106 moves downward, and the projection 206 bears against the collar 110 on the output shaft 94 with a force sufficient to overcome the holding force of the permanent magnet 100. The drive shaft 94 then begins to move downward in the direction of arrow 207.

Figure 8:
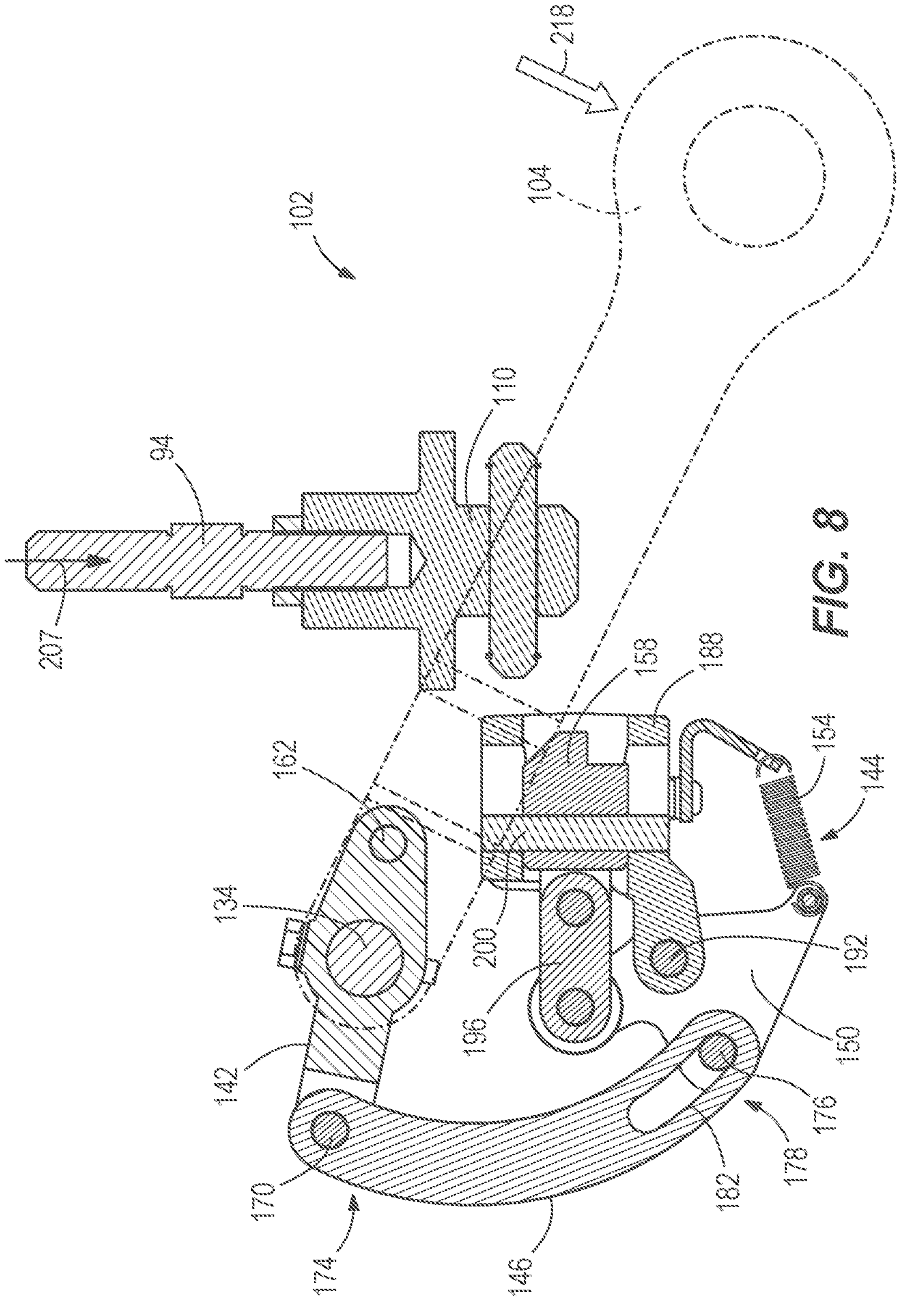
FIG. 8 is a cross-sectional view illustrating a portion of the manual trip assembly of FIG. 6 in an intermediate position.

As the operator pivots the handle 104 in the direction of arrow 218, the lost motion member 146 is moved upward by the link 142, and the third pin 176 travels along the slot 182. As such, the actuating member 150 and the plunger 158 remains stationary during an initial travel range of the handle 104. The slot 182 is sized such that the actuating member 150 remains stationary until the handle 104 reaches an intermediate position (FIG. 8). In the illustrated embodiment, the initial travel range is about 27 degrees (i.e. the handle 104 rotates 27 degrees before the third pin 176 reaches the end of the slot 182). In other embodiments, the slot 182 may be configured to provide different degrees of lost motion to suit a particular configuration of the recloser 10.

Within the initial travel range of the handle 104, the downward movement of the drive shaft 94 reduces the holding force of the permanent magnet 100 on the plunger 103 as described above. With the holding force of the permanent magnet 100 reduced, the spring 101 is able to overcome the holding force of the permanent magnet 100 and accelerate the output shaft 94 in the opening direction, opening the contacts 66, 70 in the same manner as the circuit breaking sequence described above.

Figure 9:
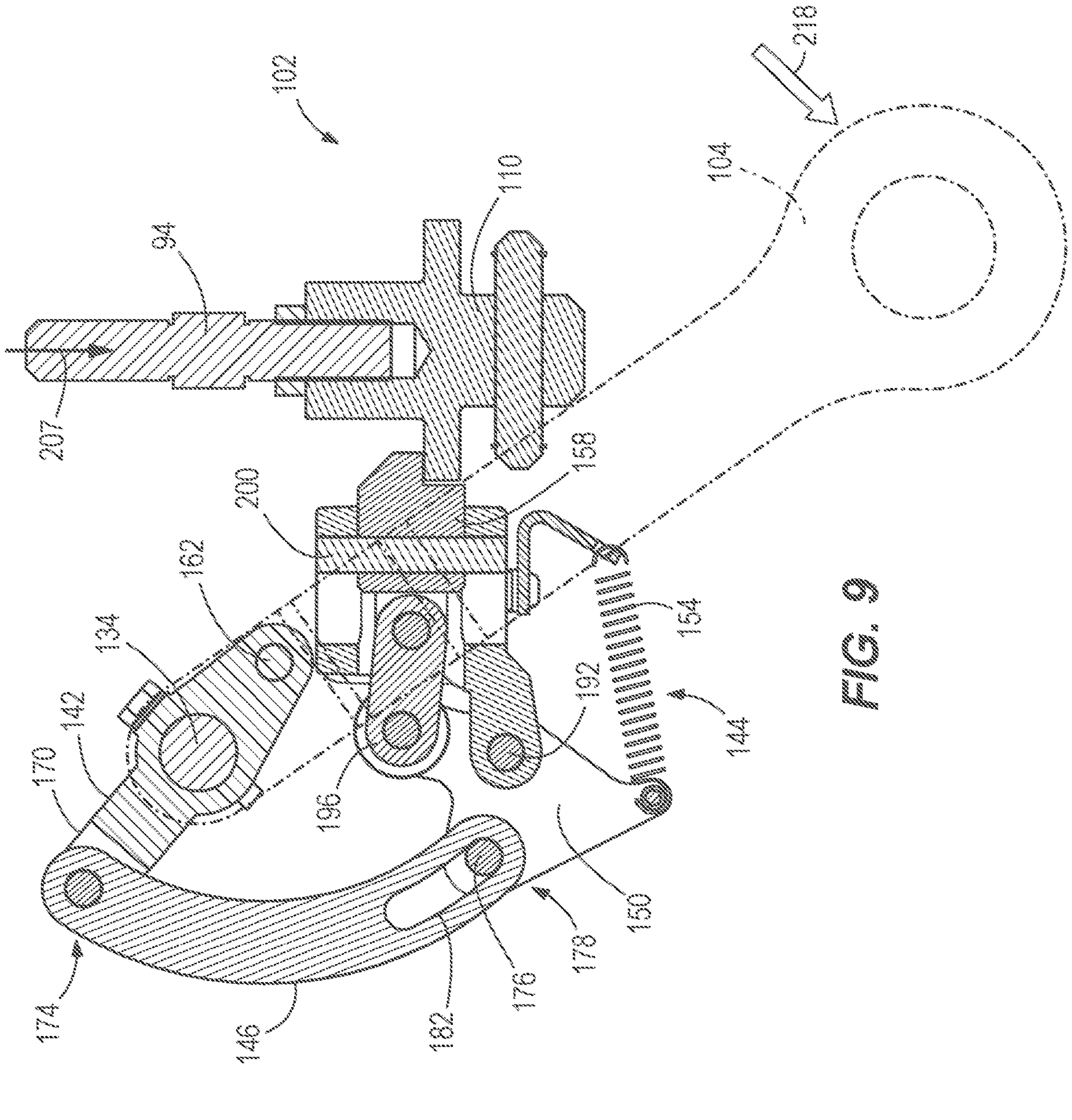
FIG. 9 is a cross-sectional view illustrating a portion of the manual trip assembly of FIG. 6 in an actuated state.

The lost motion member 146 delays movement of the blocking plunger 158 from the retracted position to the extended position until the contacts 66, 70 have been opened and the collar 110 of the output shaft 94 has moved below the blocking plunger 158. Once the handle 104 has reached the intermediate position and the contacts 66, 70 have been opened, the operator continues to rotate the handle 104 in the direction of arrow 218. With the third pin 176 engaged with the end of the slot 182, the continued rotation of the link 142 with the handle 104 and resultant upward movement of the lost motion member 146 pivots the actuating member 150 about the fourth pin 192. The actuating member 150 in turn drives the blocking plunger 158 forward toward the extended position and into the path of the collar 110 (FIG. 9). With the blocking plunger 158 in the extended position, the blocking plunger 158 is engageable with the output shaft 94 to lock the movable contact 66 in its open position, thereby preventing the electromagnetic actuator 98 from reclosing the contacts 66, 70.

In addition to the mechanical interlock provided by the blocking plunger 158, in some embodiments, the controller may determine that the manual trip assembly 102 has been actuated based on feedback from the state sensors 210, 214 (FIG. 6). In such embodiments, the state sensors 210, 214 and the controller may act as an electronic interlock assembly to prevent actuation of the electromagnetic actuator 98. For example, the controller may initiate an electronic interlock function to prevent the electromagnetic actuator 98 from reclosing the contacts 66, 70 until the controller determines that the handle 104 of the manual trip assembly 102 has been returned to its initial or unactuated position. By including both electronic and mechanical interlocks, the recloser 10 may be more safely controlled and serviced.

To disengage the interlock assembly 144, the operator pivots the handle 104 in the opposite direction, returning the plunger 158 to its retracted position (FIGS. 7-8) and lifting the collar 110. Once the controller determines that the handle 104 has been fully returned to its initial or unactuated position (e.g., via the state sensor 210), the controller may disable the electrical interlock. The contacts 66, 70 can then be reclosed via the electromagnetic actuator 98 in the manner described above.

Although the invention has been described in detail with reference to certain preferred embodiments, variations and modifications exist within the scope and spirit of one or more independent aspects of the invention as described.

Various features and advantages of the invention are set forth in the following claims.

What is claimed is:

1. A switchgear apparatus configured for operation at voltages up to 72.5 kV, comprising:
- a vacuum interrupter assembly having a fixed contact and a movable contact configured to move relative to the fixed contact between a closed position in which the movable contact is in contact with the fixed contact and an open position in which the movable contact is spaced from the fixed contact;
- an electromagnetic actuator configured to move the movable contact between the open position and the closed position;
- a manual trip assembly movable from an initial position to an actuated position to move the movable contact from the closed position to the open position; and
- a mechanical interlock assembly including a blocking plunger configured to translate in a linear direction to block and prevent the movable contact from moving from the open position to the closed position when the manual trip assembly is in the actuated position.

2. The switchgear apparatus of claim 1, wherein the electromagnetic actuator includes an output shaft, and wherein the blocking plunger is configured to inhibit movement of the output shaft to prevent the movable contact from moving from the open position to the closed position.

3. The switchgear apparatus of claim 1, wherein the mechanical interlock assembly includes a handle, and wherein the blocking plunger is movable between a retracted position and an extended position in response to rotation of the handle.

4. The switchgear apparatus of claim 3, wherein the handle is rotatable between a first position and a second position, wherein the handle is coupled to the blocking plunger via a lost motion member such that the blocking plunger remains stationary when the handle is rotated between the first position and an intermediate position between the first position and the second position.

5. The switchgear apparatus of claim 1, wherein the manual trip assembly includes a first lever and a second lever coupled to the first lever such that the first and second levers provide a compound mechanical advantage.

6. The switchgear apparatus of claim 1, wherein the manual trip assembly includes:

a support bracket, a handle, a shaft coupled for co-rotation with the handle relative to the support bracket about a first rotational axis, a link coupled for co-rotation with the shaft about the first rotational axis, and a yoke including a first end pivotally coupled to the link and a second end pivotally coupled to the support bracket.

7. The switchgear apparatus of claim 6, wherein the first end of the yoke is pivotally coupled to a first end of the link, and wherein the mechanical interlock assembly is coupled to a second end of the link.

8. The switchgear apparatus of claim 1, further comprising an electronic interlock assembly configured to prevent actuation of the electromagnetic actuator when the manual trip assembly is in the actuated position.

9. A switchgear apparatus configured for operation at voltages up to 72.5 kV, comprising:

a vacuum interrupter assembly having a fixed contact and a movable contact configured to move relative to the fixed contact between a closed position in which the movable contact is in contact with the fixed contact and an open position in which the movable contact is spaced from the fixed contact;

an electromagnetic actuator configured to move the movable contact between the open position and the closed position; and a manual trip assembly movable from an initial position to an actuated position to move the movable contact from the closed position to the open position, wherein the manual trip assembly includes a handle having a first rotational axis fixed in position to define a fulcrum and a first link having a second rotational axis spaced apart from the first rotational axis, wherein one end of the first link opposite the second rotational axis is pivotably coupled to the handle such that the handle and the first link provide a compound mechanical advantage for the first link to act upon and move the movable contact from the closed position to the open position.

10. The switchgear apparatus of claim 9, wherein the manual trip assembly further includes:

a support bracket, and a shaft coupled for co-rotation with the handle relative to the support bracket about the first rotational axis, wherein the first link is a yoke.

11. The switchgear apparatus of claim 10, wherein the manual trip assembly further includes:

a second link coupled for co-rotation with the shaft about the first rotational axis, and the one end of the yoke opposite the second rotational axis is pivotally coupled to the second link and a second end of the yoke is pivotally coupled to the support bracket at the second rotational axis.

12. The switchgear apparatus of claim 9, further comprising a mechanical interlock assembly configured to prevent the movable contact from moving from the open position to the closed position when the manual trip assembly is in the actuated position.

13. The switchgear apparatus of claim 12, wherein the mechanical interlock assembly is coupled to a second end of the second link.

14. The switchgear apparatus of claim 12, wherein the mechanical interlock assembly includes a blocking plunger.

15. The switchgear apparatus of claim 14, wherein the electromagnetic actuator includes an output shaft, and wherein the blocking plunger is configured to inhibit movement of the output shaft to prevent the movable contact from moving from the open position to the closed position, and wherein the blocking plunger is movable between a retracted position and an extended position in response to rotation of the handle.

16. The switchgear apparatus of claim 15, wherein the handle is rotatable between a first position and a second position, wherein the handle is coupled to the blocking plunger via a lost motion member such that the blocking plunger remains stationary when the handle is rotated between the first position and an intermediate position between the first position and the second position.

17. The switchgear apparatus of claim 9, further comprising a housing enclosing the vacuum interrupter assembly and the electromagnetic actuator, wherein the handle is positioned along an exterior side of the housing, and wherein the handle includes a high-visibility color that contrasts with the housing.

18. The switchgear apparatus of claim 9, further comprising an electronic interlock assembly, wherein the electronic interlock assembly is configured to prevent actuation of the electromagnetic actuator when the manual trip assembly is in the actuated position.

19. A switchgear apparatus configured for operation at voltages up to 72.5 kV, comprising:

a vacuum interrupter assembly having a fixed contact and a movable contact configured to move relative to the fixed contact between a closed position in which the movable contact is in contact with the fixed contact and an open position in which the movable contact is spaced from the fixed contact, wherein the movable contact moves along a first path;

an electromagnetic actuator configured to move the movable contact between the open position and the closed position;

a manual trip assembly movable from an initial position to an actuated position to move the movable contact from the closed position to the open position; and a mechanical interlock assembly configured to translate along a second path that intersects the first path to block and prevent the movable contact from moving from the open position to the closed position when the manual trip assembly is in the actuated position.

* * * * *